(12) United States Patent
Kim et al.

(10) Patent No.: US 7,542,395 B2
(45) Date of Patent: Jun. 2, 2009

(54) METHOD OF RECORDING DATA ON A MULTI-LAYER RECORDING MEDIUM, RECORDING MEDIUM, AND APPARATUS THEREOF

(75) Inventors: Jin Yong Kim, Seongnam-si (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/723,816

(22) Filed: Mar. 22, 2007

(65) Prior Publication Data

US 2007/0171791 A1 Jul. 26, 2007

Related U.S. Application Data

(63) Continuation of application No. 10/880,663, filed on Jul. 1, 2004.

(30) Foreign Application Priority Data

| Jul. 9, 2003 | (KR) | ........................ 10-2003-0046420 |
| Sep. 9, 2003 | (KR) | ........................ 10-2003-0063271 |
| Sep. 15, 2003 | (KR) | ........................ 10-2003-0063591 |
| Sep. 22, 2003 | (KR) | ........................ 10-2003-0065628 |

(51) Int. Cl.
*G11B 7/013* (2006.01)

(52) U.S. Cl. .................. 369/59.25; 369/275.3

(58) Field of Classification Search ............. 369/47.36, 369/59.25, 47.27, 47.38, 189, 275.3
See application file for complete search history.

(56) References Cited

U.S. PATENT DOCUMENTS 5,361,173 A 11/1994 Ishii et al.
5,485,469 A 1/1996 Suzuki
5,590,096 A 12/1996 Ohtsuka et al.
5,636,631 A 6/1997 Waitz et al.
5,764,621 A 6/1998 Choi
5,793,546 A 8/1998 Tanaka
5,835,462 A 11/1998 Mimnagh (Continued)

FOREIGN PATENT DOCUMENTS

| CN | 1151071 A | 6/1997 |
| CN | 1400588 | 3/2003 |
| CN | 1656544 A | 8/2005 |
| EP | 0 265 984 | 5/1988 |
| EP | 0 552 903 | 7/1993 |

(Continued)

OTHER PUBLICATIONS

International Search Report issued Sep. 16, 2004 in corresponding International patent Application No. PCT/KR2004/001624.

(Continued)

*Primary Examiner*—Wayne R Young
*Assistant Examiner*—Thomas D Alunkal
(74) *Attorney, Agent, or Firm*—Harness, Dickey & Pierce, P.L.C.

(57) ABSTRACT

A method for recording data on a recording medium having one or more recording layers. The method includes reading control information having a plurality of control information units for controlling recording/reproducing of data from the recording medium. The control information unit includes an identifier of the recording layer to which the control information unit applies and a recording velocity applicable to the corresponding recording layer. A sequence of the information units is ordered according to the recording velocity and the recording layer identifier.

26 Claims, 15 Drawing Sheets

U.S. PATENT DOCUMENTS

| | | | |
|---|---|---|---|
| 5,892,633 | A | 4/1999 | Ayres et al. |
| 5,959,962 | A | 9/1999 | Matsumaru et al. |
| 6,415,435 | B1 | 7/2002 | McIntyre |
| 6,480,450 | B1 | 11/2002 | Fujii et al. |
| 6,487,713 | B1 | 11/2002 | Cohen et al. |
| 6,504,806 | B1 * | 1/2003 | Nakajo .................... 369/59.12 |
| 6,535,470 | B1 | 3/2003 | Wu |
| 6,580,671 | B1 | 6/2003 | Otomo et al. |
| 6,643,233 | B1 | 11/2003 | Yen et al. |
| 6,684,328 | B2 | 1/2004 | Matsuura |
| 6,868,054 | B1 | 3/2005 | Ko |
| 6,894,961 | B1 | 5/2005 | Osakabe |
| 6,996,047 | B2 | 2/2006 | Nagano |
| 6,999,393 | B2 | 2/2006 | Yamada |
| 7,012,878 | B2 | 3/2006 | Shinotsuka et al. |
| 7,075,871 | B2 | 7/2006 | Kato et al. |
| 7,088,667 | B2 | 8/2006 | Kobayashi |
| 7,161,881 | B2 | 1/2007 | Pereira |
| 7,170,841 | B2 * | 1/2007 | Shoji et al. ............... 369/59.25 |
| 7,193,948 | B2 | 3/2007 | Furukawa et al. |
| 7,212,480 | B2 | 5/2007 | Shoji et al. |
| 7,218,585 | B2 | 5/2007 | Tanii et al. |
| 7,230,907 | B2 | 6/2007 | Shoji et al. |
| 7,286,455 | B2 | 10/2007 | Shoji et al. |
| 7,304,938 | B2 | 12/2007 | Hwang et al. |
| 7,345,970 | B2 | 3/2008 | Kim et al. |
| 7,369,475 | B2 | 5/2008 | Nagai |
| 7,376,072 | B2 | 5/2008 | Shoji et al. |
| 7,400,571 | B2 | 6/2008 | Shoji et al. |
| 7,414,936 | B2 | 8/2008 | Tasaka et al. |
| 7,423,951 | B2 | 9/2008 | Shoji et al. |
| 7,471,879 | B2 | 12/2008 | Fuchigami et al. |
| 2001/0044935 | A1 | 11/2001 | Kitayama |
| 2001/0053115 | A1 | 12/2001 | Nobukuni et al. |
| 2002/0021656 | A1 * | 2/2002 | Tsukagoshi et al. ...... 369/275.3 |
| 2002/0044509 | A1 | 4/2002 | Nakajima |
| 2002/0048241 | A1 | 4/2002 | Kumagai et al. |
| 2002/0048646 | A1 | 4/2002 | Tomura et al. |
| 2002/0085470 | A1 | 7/2002 | Yokoi |
| 2002/0089914 | A1 | 7/2002 | Nakajo |
| 2002/0126604 | A1 | 9/2002 | Powelson et al. |
| 2002/0126611 | A1 | 9/2002 | Chang |
| 2002/0159352 | A1 | 10/2002 | Yamada |
| 2002/0167880 | A1 | 11/2002 | Ando et al. |
| 2003/0021201 | A1 * | 1/2003 | Kobayashi ............... 369/47.39 |
| 2003/0021202 | A1 * | 1/2003 | Usui et al. ............... 369/47.39 |
| 2003/0048241 | A1 | 3/2003 | Shin et al. |
| 2003/0058771 | A1 | 3/2003 | Furukawa et al. |
| 2003/0086345 | A1 | 5/2003 | Ueki |
| 2003/0086346 | A1 | 5/2003 | Fukumoto |
| 2003/0137915 | A1 | 7/2003 | Shoji et al. |
| 2003/0151994 | A1 | 8/2003 | Tasaka et al. |
| 2003/0159135 | A1 | 8/2003 | Hiller et al. |
| 2003/0223339 | A1 | 12/2003 | Taniguchi et al. |
| 2003/0231567 | A1 | 12/2003 | Moritomo |
| 2003/0237024 | A1 | 12/2003 | Ogawa et al. |
| 2004/0001407 | A1 | 1/2004 | Kim et al. |
| 2004/0004921 | A1 | 1/2004 | Lee et al. |
| 2004/0010745 | A1 * | 1/2004 | Lee et al. .................... 714/769 |
| 2004/0013074 | A1 | 1/2004 | Lee et al. |
| 2004/0022150 | A1 * | 2/2004 | Lee et al. ................. 369/47.39 |
| 2004/0030962 | A1 | 2/2004 | Swaine et al. |
| 2004/0062160 | A1 | 4/2004 | Park et al. |
| 2004/0076096 | A1 | 4/2004 | Hwang et al. |
| 2004/0090888 | A1 | 5/2004 | Park et al. |
| 2004/0114474 | A1 | 6/2004 | Park et al. |
| 2004/0125717 | A1 | 7/2004 | Ko et al. |
| 2004/0145980 | A1 | 7/2004 | Park et al. |
| 2004/0184395 | A1 | 9/2004 | Lee et al. |
| 2004/0223434 | A1 | 11/2004 | Nishimura et al. |
| 2005/0019023 | A1 | 1/2005 | Ko |
| 2005/0036425 | A1 | 2/2005 | Suh et al. |
| 2005/0038957 | A1 | 2/2005 | Suh |
| 2006/0233059 | A1 | 10/2006 | Suh et al. |
| 2007/0088954 | A1 | 4/2007 | Furukawa et al. |
| 2008/0043588 | A1 | 2/2008 | Suh et al. |

FOREIGN PATENT DOCUMENTS

| | | |
|---|---|---|
| EP | 0 968 769 | 1/2000 |
| EP | 0 968 769 A2 | 1/2000 |
| EP | 1 172 810 A2 | 1/2002 |
| EP | 1 244 097 | 6/2002 |
| EP | 1 298 659 | 4/2003 |
| EP | 1 308 942 | 5/2003 |
| EP | 1 329 888 | 7/2003 |
| EP | 1 331 631 A1 | 7/2003 |
| EP | 1 361 571 | 11/2003 |
| EP | 1 369 850 A1 | 12/2003 |
| EP | 1 471 506 | 10/2004 |
| EP | 1 522 994 | 4/2005 |
| EP | 1 605 445 A2 | 12/2005 |
| JP | 6309802 | 11/1994 |
| JP | 9128899 | 5/1997 |
| JP | 09-160761 | 6/1997 |
| JP | 11-085413 | 3/1999 |
| JP | 2000-113458 | 4/2000 |
| JP | 2002-050053 | 2/2002 |
| JP | 2002-230764 | 8/2002 |
| JP | 2002-245625 | 8/2002 |
| JP | 2002-352430 | 12/2002 |
| JP | 2002-352435 | 12/2002 |
| JP | 2003-006860 | 1/2003 |
| JP | 2003-045036 | 2/2003 |
| JP | 2003-203341 | 7/2003 |
| JP | 2003-257026 | 9/2003 |
| WO | WO 97/13244 | 4/1997 |
| WO | WO 00/79525 | 12/2000 |
| WO | WO 02/17308 | 2/2002 |
| WO | WO 02/29791 A1 | 4/2002 |
| WO | WO 02/065462 | 8/2002 |
| WO | WO 02/086887 | 10/2002 |
| WO | WO 02/089123 | 11/2002 |
| WO | WO 03/010519 | 2/2003 |
| WO | WO 03/025935 | 3/2003 |
| WO | WO 03/067581 | 8/2003 |
| WO | WO 03/075265 | 9/2003 |
| WO | WO 03/105139 | 12/2003 |
| WO | WO 2004/013845 A1 | 2/2004 |
| WO | WO 2004/015707 | 2/2004 |
| WO | WO 2004/072966 | 8/2004 |
| WO | WO 2005/001819 A1 | 1/2005 |

OTHER PUBLICATIONS

Communication issued by European Patent Office on May 30, 2007 in counterpart EP App. No. 04 748 381.3.

Communication issued by European Patent Office on Jun. 1, 2007 in counterpart EP App. No. 07104646.0.

Communication issued by European Patent Office on Jun. 1, 2007 in counterpart EP App. No. 07104648.6.

Search Report for corresponding European application dated Apr. 15, 2008.

Office Action for corresponding Russian application dated Jun. 23, 2008.

Search Report dated Jul. 2, 2008 by European Patent Office for a counterpart European application.

Office Action for corresponding Chinese Application No. 200710127832 dated Dec. 5, 2008.

* cited by examiner

- ISA : Inner Spare Area
- OSA : Outer Spare Area
- PIC : Permanent Information & Control data
- TDMA : Temporary Defect Management Area

FIG. 5A

PIC 1 cluster

| | |
|---|---|
| "00h" | 1'st DI (1X L0) |
| "01h" | 2'nd DI (1X L1) |
| "02h" | 3'rd DI (1X L2) |
| "03h" | 4'th DI (1X L3) |
| "04h" | 5'th DI (2X L0) |
| "05h" | 6'th DI (2X L1) |
| "06h" | 7'th DI (2X L2) |
| "07h" | 8'th DI (2X L3) |
| "08h" | 9'th DI (4X L0) |
| "09h" | 10'th DI (4X L1) |
| "10h" | 11'th DI (4X L2) |
| "11h" | 12'th DI (4X L3) |
| "12h" | 13'th DI (6X L0) |
| "13h" | 14'th DI (6X L1) |
| "14h" | 15'th DI (6X L2) |
| "15h" | 16'th DI (6X L3) |

FIG. 5B

PIC 1 cluster

| | |
|---|---|
| "00h" | 1'st DI (1X L0) |
| "01h" | 2'nd DI (1X L1) |
| "02h" | 3'rd DI (2X L0) |
| "03h" | 4'th DI (2X L1) |
| "04h" | 5'th DI (4X L0) |
| "05h" | 6'th DI (4X L1) |
| "06h" | 7'th DI (6X L0) |
| "07h" | 8'th DI (6X L1) |

METHOD OF RECORDING DATA ON A MULTI-LAYER RECORDING MEDIUM, RECORDING MEDIUM, AND APPARATUS THEREOF

DOMESTIC PRIORITY INFORMATION

This is a continuation application of application Ser. No. 10/880,663 filed Jul. 1, 2004, the entire contents of which are hereby incorporated by reference.

FOREIGN PRIORITY INFORMATION

This application claims the benefit of the Korean Application No. 10-2003-0046420 filed on Jul. 9, 2003, Korean Application No. 10-2003-0063271 filed on Sep. 9, 2003, Korean Application No. 10-2003-0063591 filed on Sep. 15, 2003, and Korean Application No. 10-2003-0065628 filed on Sep. 22, 2003, which are hereby incorporated by reference.

BACKGROUND OF THE INVENTION

1. Field of the Invention

The present invention relates to recording media, and more particularly, to a method of recording disc control information on a recordable optical disc including at least one recording layer, in which writing speed information and per writing speed write strategy information (write strategy parameters) are included within the recorded disc control information, and to method of recording data using the disc control information recorded in a specific area of the recordable optical disc.

2. Discussion of the Related Art

A high density optical recording medium, known as HD-DVD, is widely used to record and store high-definition video data, large-amount program data, and high-quality audio data and so on. The Blu-ray disc represents next-generation HD-DVD technology. Technological specifications are now being established for the global standardization of the Blu-ray disc, including standards for the write once Blu-ray disc (BD-WO). Meanwhile, a rewritable Blu-ray disc, known as the 1x-speed BD-RE and now being discussed, should be compatible with BD-RE discs expected to have higher writing speeds, i.e., the 2X-speed BD-RE and beyond. BD-WO specifications for high writing speed are also in progress. Efficient solutions for coping with the high writing speed of a high-density optical disc are Urgently needed, and the specifications established should ensure mutual compatibility.

SUMMARY OF THE INVENTION

One exemplary embodiment relates to a method for recording data on a recording medium having one or more recording layers. The method calls for reading control information including a plurality of control information units for controlling recording/reproducing of data from the recording medium. The control information unit includes an identifier of the recording layer to which the control information unit applies and a recording velocity applicable to the corresponding recording layer. A sequence of the information units is ordered according to the recording velocity and the recording layer identifier.

Another exemplary embodiment relates to an apparatus for recording data on a recording medium having one or more recording layers. The apparatus having a pick-up part for reading control information including a plurality of control information units for controlling recording/reproducing of data from the recording medium. The control information unit includes an identifier of the recording layer to which the control information unit applies and a recording velocity applicable to the corresponding recording layer. A sequence of the information units is ordered according to the recording velocity and the recording layer identifier. A controller is used for controlling the recording of the data on the recording medium based on the read control information.

Another exemplary embodiment relates to a recording medium having one or more recording layers. The recording medium having a data area configured to record user data on each recording layer; and one or more management area configured to record at least one control information block including a plurality of control information unit for controlling recording/reproducing of the user data. The control information unit including an identifier of the recording layer to which the control information unit applies and a recording velocity applicable to the corresponding recording layer. A sequence of the information units is ordered according to the recording velocity and the recording layer identifier.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A and 5B are diagrams of a sample configuration sequence of the disc control information recorded according to the first embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM/-RW/+RW/-R/+R and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'disc control information' in the description of the present invention means an area including various information for disc record playback or information for disc record playback. And, the disc control information is commonly designated information provided to a prerecorded area within a disc or to an embossed area for a disc user by a disc manufacturer. Yet, the disc control information is provided not only to the prerecorded area but also to a recordable area. The disc information within the prerecorded or embossed area can be copied to the recordable area as well. And, they are just exemplary.

For instance, the disc control information is called 'disc information' in BD or 'physical format information' in DVD-RAM/-RW/+RW/-R/+R. Hence, it is apparent that the technical background of the present invention is identically applicable to 'physical format information' in DVD-RAM/-RW/+RW/-R/+R. For convenience of explanation, 'disc information (hereinafter abbreviated DI)' corresponding to a case of Blu-ray disc (BD) is taken as an example.

Figure 1:
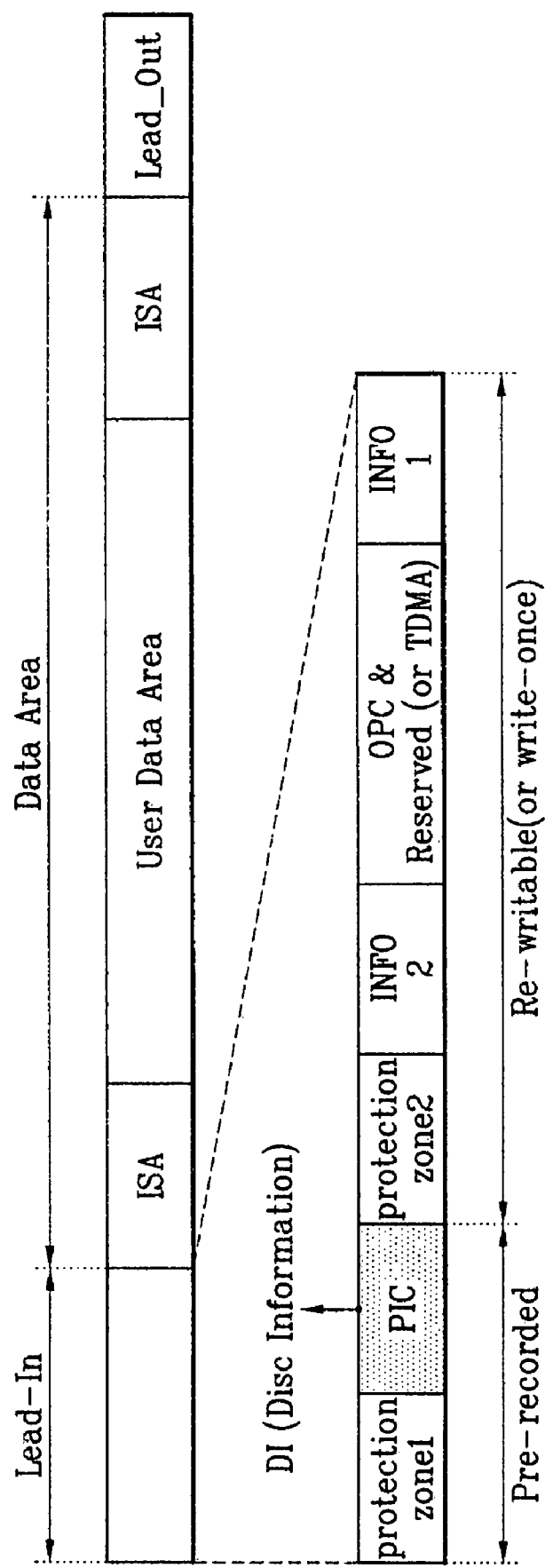
FIG. 1 is a diagram of a single-layer disc applicable to the present invention.
Figure 2:
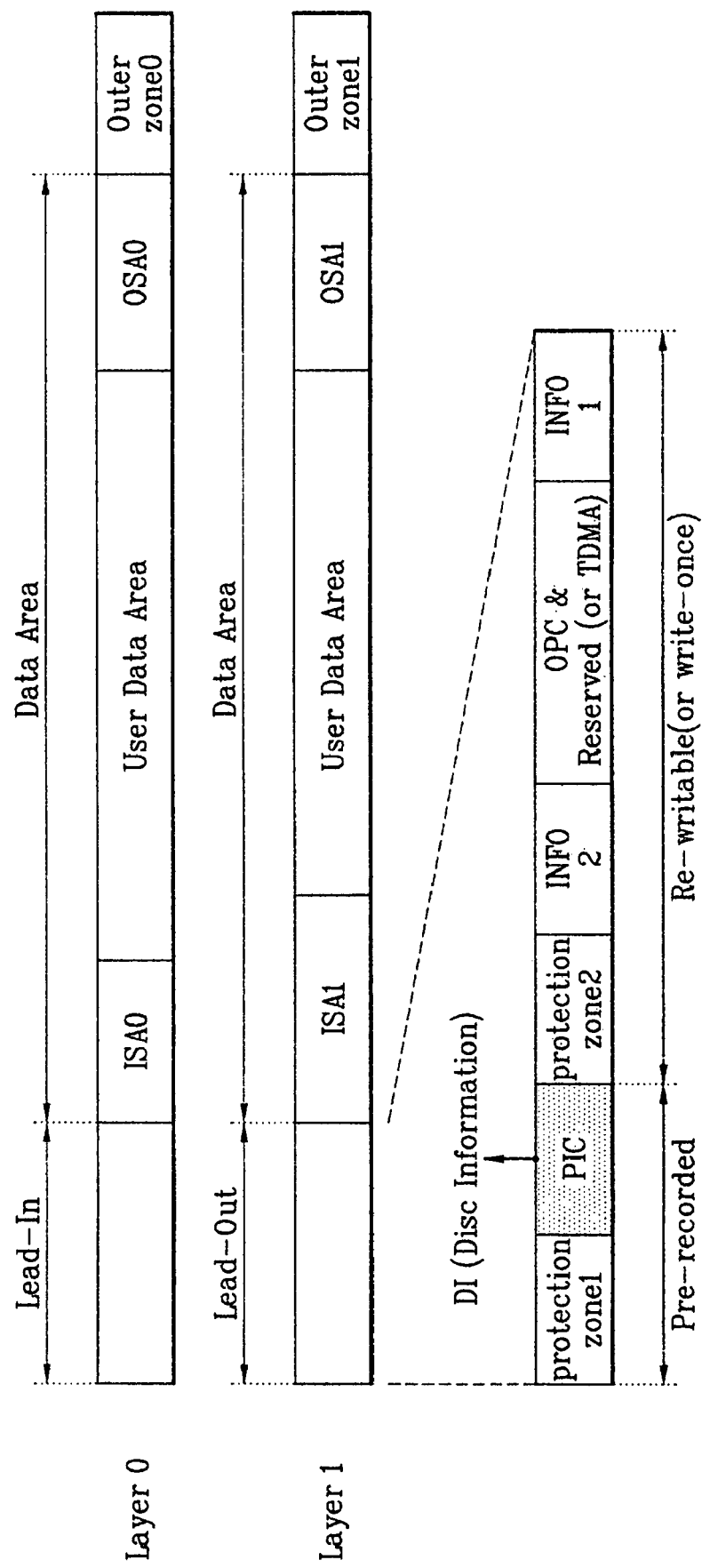
FIG. 2 is a diagram of a dual-layer disc applicable to the present invention.

FIG. 1 and FIG. 2 are structural diagrams of optical discs according to the present invention, in which a recordable optical disc is enough to be the optical disc applicable to the present invention. Moreover, the recordable disc can be any one of a rewritable optical disc, a write-once optical disc, and the like.

FIG. 1 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc. Specifically, a prerecorded area and a rewritable or write-once area are separated from each other within the inner circumference area of the disc.

The prerecorded area is an area (called 'embossed area') where data was already written in manufacturing the disc, whereby a user or system is unable to perform data writing on the prerecorded area at all. In BD-RE/WO, the prerecorded area is named PIC (permanent information and control data) area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

The present invention intends to provide a method of efficiently recording disc information (DI) as disc control information required for record playback of a disc in the prerecorded or recordable area. It is apparent that a recording method in the prerecorded area is differently applied to each kind of discs. In case of BD-RE/WO, the PIC area as the prerecorded area is recorded by biphased high frequency modulated signals, the high frequency modulated signals in the corresponding area are played back according to a specific playback method, and information is acquired from the playback.

FIG. 2 is a diagram of a dual-layer disc having dual recording layers, in which a recording layer starting with a lead-in is named a first recording layer Layer0 and a recording layer ending with a lead-out is named a second recording layer Layer1.

In the dual-layer disc, the PIC area is provided to lead-in and lead-out areas of a disc inner circumference area, and disc information (DI) of the same contents is recorded in the PIC area.

Figure 3:
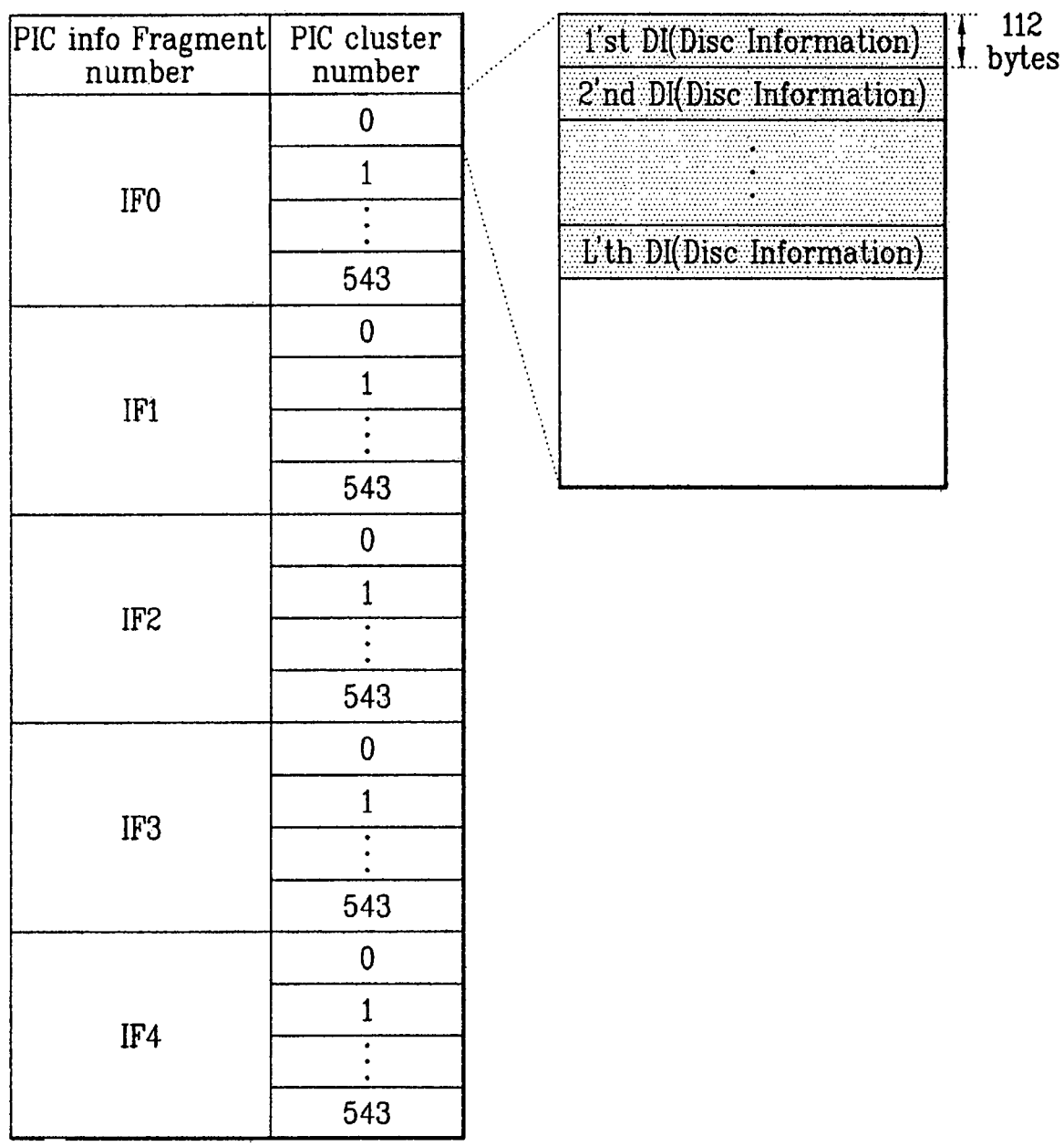
FIG. 3 is a diagram of a management area where disc control information of the present invention is recorded, illustrating a disc information recording format.

FIG. 3 is a structural diagram of a PIC area in the disc shown in FIG. 1 or FIG. 2. As mentioned in the foregoing description, it means that information can be rearranged like the structure of the PIC area in FIG. 3 when the entire information within the high frequency modulated PIC area is acquired.

A method of configuring disc information (DI) in the PIC area is explained in detail as follows.

In BD-RE/WO, 'one cluster' represents a minimum record unit, five hundred forty-four clusters gather to construct one fragment as one upper record unit, and total five fragments gather to form the PIC area. Disc information is recorded in a front head cluster of a first fragment IF0. The disc information is plurally recorded per recording layer and writing speed permitted by the corresponding optical disc, and one disc information includes one hundred twelve bytes. Specifically, disc information constructed with 112-bytes is called disc information (DI) frame. Moreover, the same contents of the disc information are repeatedly recorded in each front head cluster of the rest of the fragments, thereby enabling to cope with loss of the disc information.

Information representing the corresponding recording layer, information representing writing speed, and write strategy information corresponding to the writing speed are recorded within each disc information. Hence, such information is utilized in record playback of the corresponding optical disc, thereby enabling to provide optimal recording power per recording layer and per writing speed.

Namely, the disc information (DI) of the present invention is characterized in providing specific writing speed information supported by the corresponding disc and associated write strategy information, and more specifically, in providing specific writing speed supported for each recording layer and associated write strategy information via a specified method in case that a plurality of recording layers exist in the corresponding disc.

And, the specific configuration of the disc information (DI) relates to that of Blu-ray disc (BD). It is also apparent that a DVD based disc may have a configuration different from the above-explained structure. Specifically, if a size of disc information (DI) corresponds to that of BD, it is 112-bytes equivalently for example. Yet, by regarding disc information (DI) of the same recording layer as one information to provide once without repeating common information, it may be able to configure the write strategy differing per writing speed only in addition.

Various embodiments for a method of configuring disc information and a method of recording specific information and the like within disc information according to the present invention are explained in detail by referring to the attached drawings as follows.

FIGS. 4 to 7C are diagrams for a method of recording disc information of an optical disc according to a first embodiment of the present invention, in which disc information is configured per writing speed and in which disc information is configured in a specific sequence per recording layer within each corresponding writing speed.

Figure 4:
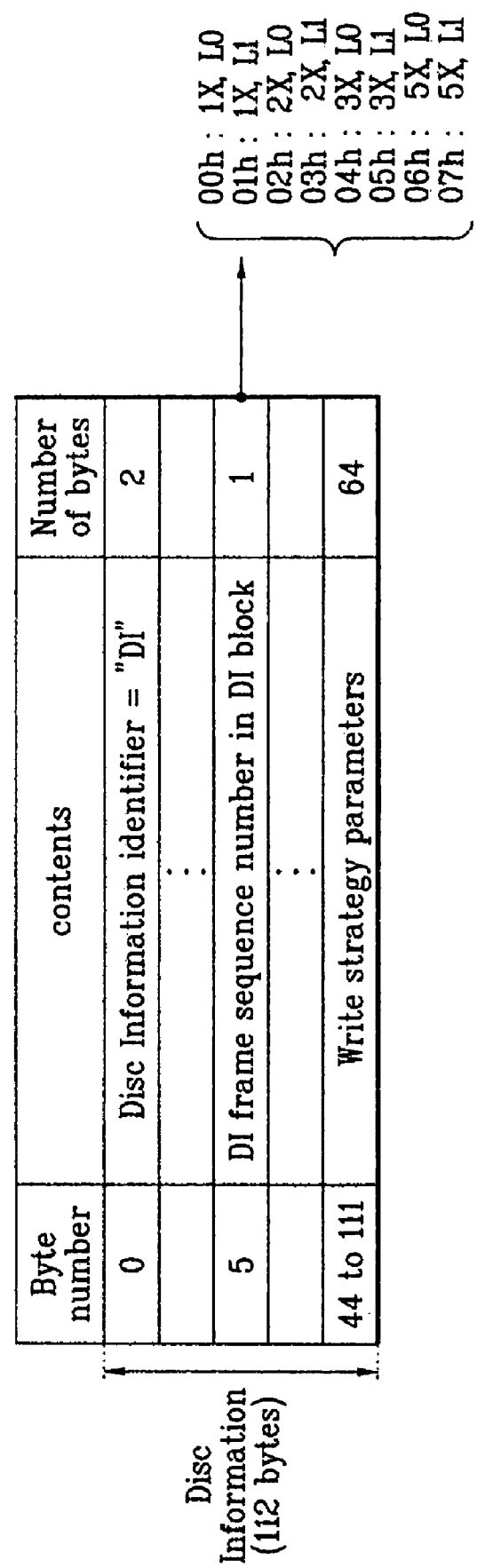
FIG. 4 is a diagram of a sample data structure of disc control information recorded according to a first embodiment of the present invention.

FIG. 4 shows a concept of recording disc control information of an optical disc according to a first embodiment of the present invention.

Referring to FIG. 4, a sequence for disc information each is decided by a sequence number and is recorded by 1-byte. For instance, the information is recorded in a $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

In configuring disc information, the present invention is characterized in that disc information is separately provided per writing speed and per recording layer and that a configuration sequence of a plurality of the separately provided disc informations is uniformly decided according to a predetermined manner.

For instance, if a corresponding optical disc includes a pair of recoding layers and four kinds of applicable writing speeds (e.g., 1× speed, 2× speed, 3× speed, and 4× speed) exist, disc information can be configured in a following manner.

'00h' of $1^{st}$ disc information is related to 1× speed and $1^{st}$ recording layer L0. '01h' of $2^{nd}$ disc information is related to 1× speed and $2^{nd}$ recording layer L1. '02h' of $3^{rd}$ disc information is related to 2× speed and $1^{st}$ recording layer L0. '03h' of $4^{th}$ disc information is related to 2× speed and $2^{nd}$ recording layer L1. '04h' of $5^{th}$ disc information is related to 3× speed and $1^{st}$ recording layer L0. '05h' of $6^{th}$ disc information is related to 3× speed and $2^{nd}$ recording layer L1. '06h' of $7^{th}$ disc information is related to 5× speed and $1^{st}$ recording layer L0. And, '07h' of $8^{th}$ disc information is related to 5× speed and $2^{nd}$ recording layer L1.

Namely, in configuring disc information, the present invention is characterized in that at least one disc information is configured per writing speed and the respective per writing speed disc informations are reconfigured per recording layer. Hence, the writing speed is preferred in the sequence of configuring the disc informations to a recording layer type.

FIG. 5A exemplarily shows a method of configuring disc information according the first embodiment of the present invention in FIG. 4, in which total sixteen disc informations are configured in case that four kinds of applicable writing speeds (e.g., 1×, 2×, 4×, and 6×) and four recording layers (L0, L1, L2, and L3) exist within a disc.

Referring to FIG. 5A, $1^{st}$ to $4^{th}$ disc informations 00h to 03h become disc information for 1× speed, $5^{th}$ to $8^{th}$ disc informations 04h to 07h become disc information for 2× speed, $9^{th}$ to $12^{th}$ disc informations 08h to 11h become disc information for 4× speed, and $13^{th}$ to $16^{th}$ disc informations 02h to 15h become disc information for 6× speed.

And, per writing speed disc informations come into configuring separate disc informations per recording layer to define as follows. Namely, '00h', '04h', '08h' and '12h' mean disc informations for "1" recording layer L0 at corresponding writing speeds, respectively. '01h', '05h', '09h', and '13h' mean disc informations for $2^{nd}$ recording layer L1 at corresponding writing speeds, respectively. '02h', '06h', '10h', and '14h' mean disc informations for $3^{rd}$ recording layer L2 at corresponding writing speeds, respectively. And, '03h', '107h', '11h', and '15h' mean disc informations for $4^{th}$ recording layer L3 at corresponding writing speeds, respectively.

FIG. 5B exemplarily shows a method of configuring disc information according the first embodiment of the present invention in FIG. 4, in which total eight disc informations are configured in case that four kinds of applicable writing speeds (e.g., 1×, 2×, 4×, and 6×) and two recording layers (L0, L1) exist within a disc.

The disc information configuring method in FIG. 5B is as good as that in FIG. 5A. First of al, per writing speed disc informations are preferentially configured and then reconfigured per recording layer.

Figure 6A:
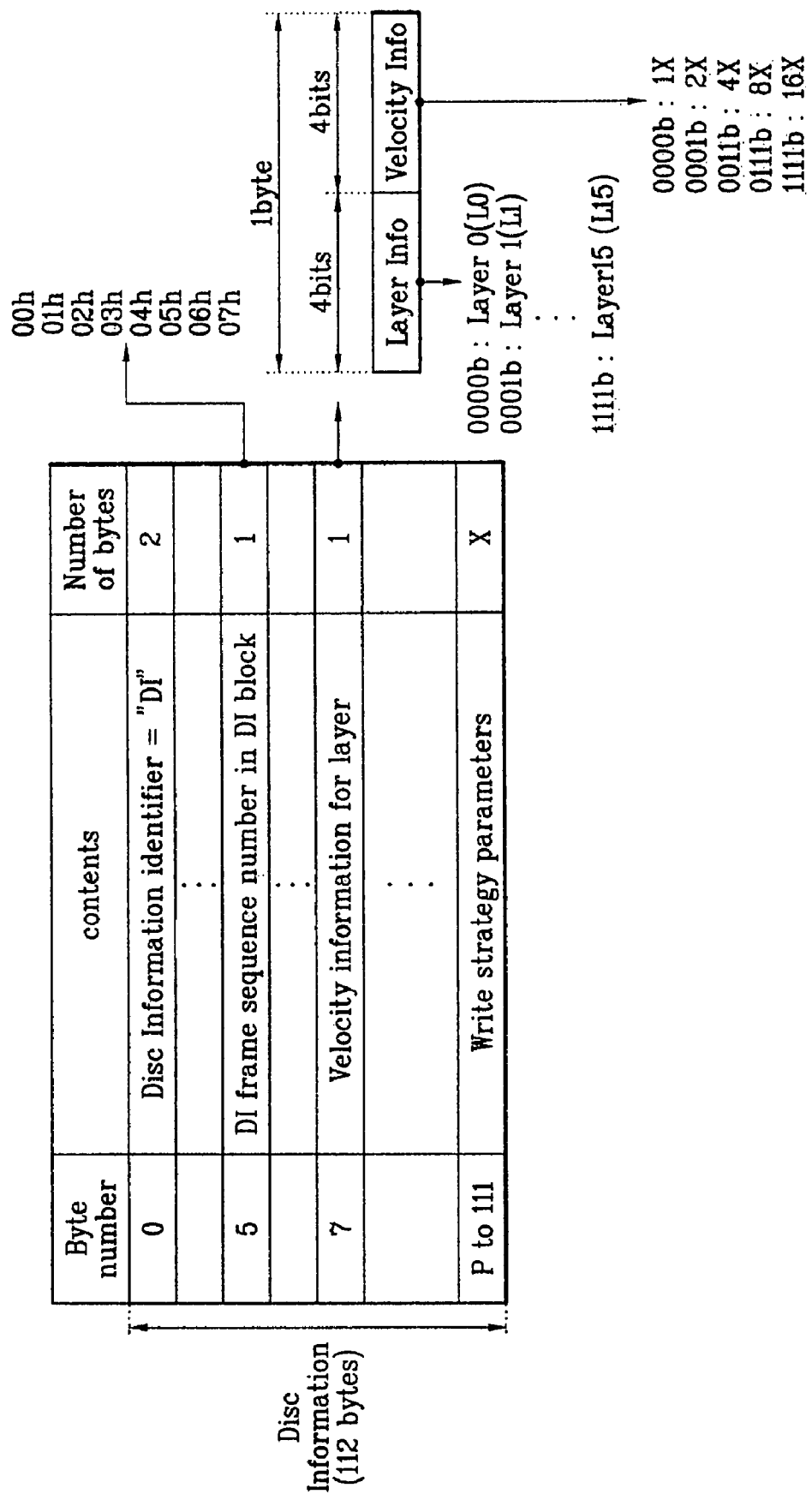
FIGS. 6A and 6B are exemplary diagrams of recording the disc control information according to the first embodiment of the present invention.
Figure 6B:
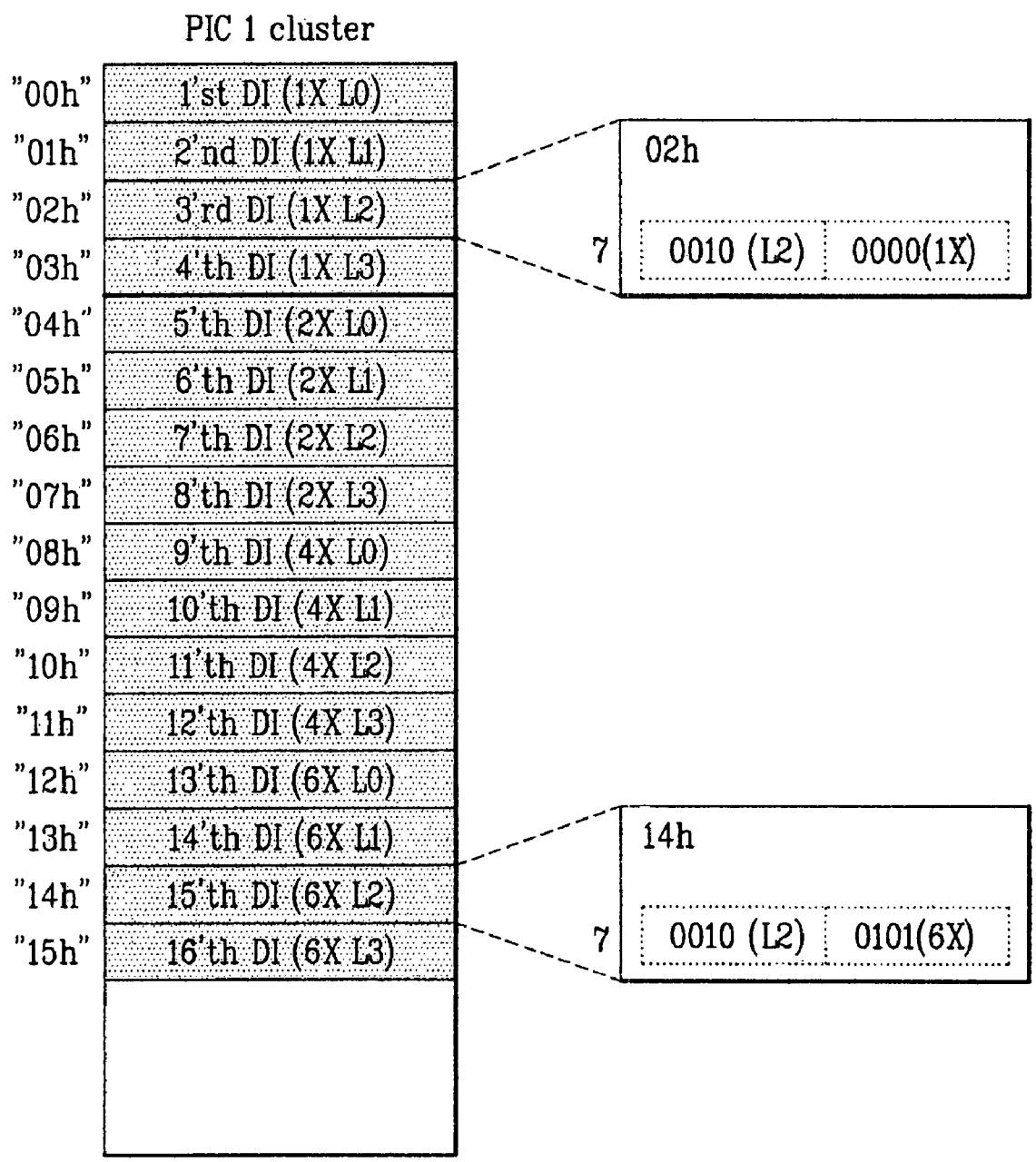

FIG. 6A and FIG. 6B are exemplary diagrams of recording the disc control information according to the first embodiment of the present invention, in which intrinsic 'recording layer information' and 'writing speed information' are recorded within disc information.

Referring to FIG. 6A, 'DI frame sequence number in DI block' is provided to $5^{th}$ byte of each disc information to mean a sequence, which means that disc informations are configured in a specific sequence in the same manner of FIG. 4. Besides, recording layer information and recording velocity information to be used for corresponding disc information are represented by specific bits to be provided to a specific area, e.g., $7^{th}$ byte, within the corresponding disc information each. For instance, the recording layer information and the recording velocity information are recorded in upper and lower 4-bits of the $7^{th}$ byte, respectively.

The recording layer information is defined as follows. First of all, '000b' of the recording layer information means $1^{st}$ recording layer L0. '0001b' of the recording layer information means $2^{nd}$ recording layer L1. And, '1111b' of the recording layer information means $16^{th}$ recording layer L115.

Meanwhile, the recording velocity information enables to define 4-bits in various ways as follows. Namely, '0000b', '0001b', '0011b', '0111b', and '1111b' are defined to mean 1× speed, 2× speed, 4× speed, 8× speed, and 16× speed, respectively.

Hence, the above-manners of defining the recording layer information and the recording velocity information can be defined in various ways via specification establishment. For example, the recording layer or velocity information can be defined by allocating 1-byte thereto.

Thus, the intrinsic recording layer and velocity informations corresponding to its sequence number, as shown in FIG. 6A, are recorded in a previously promised specific location ($7^{th}$ byte), whereby it is facilitated to confirm the recording layer and velocity informations of the corresponding disc information. And, write power or write parameters fitting the recording layer and velocity are recorded in detail using $P^{th}$~$111^{th}$ bytes, thereby enabling efficient record playback using the informations.

FIG. 6B shows an example of disc information including its intrinsic recording layer information and recording velocity information, in which total sixteen disc informations are configured in case that four kinds of applicable writing speeds (e.g., 1×, 2×, 4×, and 6×) and four recording layers (L0, L1, L2, and L3) exist within a disc.

The detailed configuring method of the disc information is the same in FIG. 5A. Considering the example in FIG. 6A, each of the disc informations includes its intrinsic recording layer information and recording velocity information. For instance, upper 4-bits of $7^{th}$ byte within '02h' of $3^{rd}$ disc information is set to '0010' to indicate $3^{rd}$ recording layer L2 and lower 4-bits thereof is set to '0000' to indicate 1× speed, whereby it can be apparently represented that the corresponding disc information relates to 1× speed and $3^{rd}$ recording layer.

For another instance, upper 4-bits of $7^{th}$ byte within '14h' of $15^{th}$ disc information is set to '0010' to indicate $3^{rd}$ recording layer L2 and lower 4-bits thereof is set to '0101' to indicate 1× speed, whereby it can be apparently represented that the corresponding disc information relates to 6× speed and $3^{rd}$ recording layer.

Figure 7A:
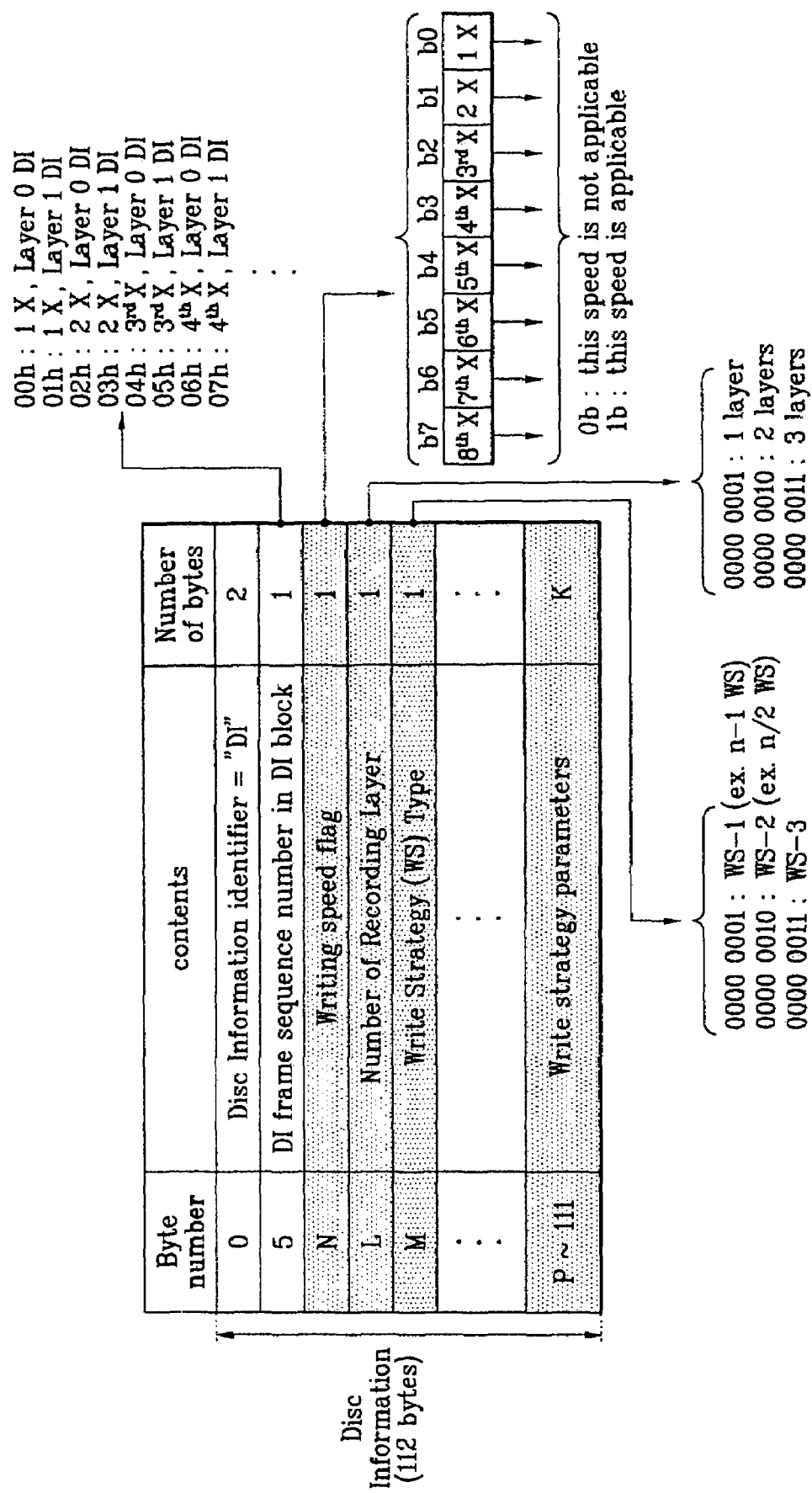
FIGS. 7A-7C are other exemplary diagrams of recording the disc information according to the first embodiment of the present invention.
Figure 7B:
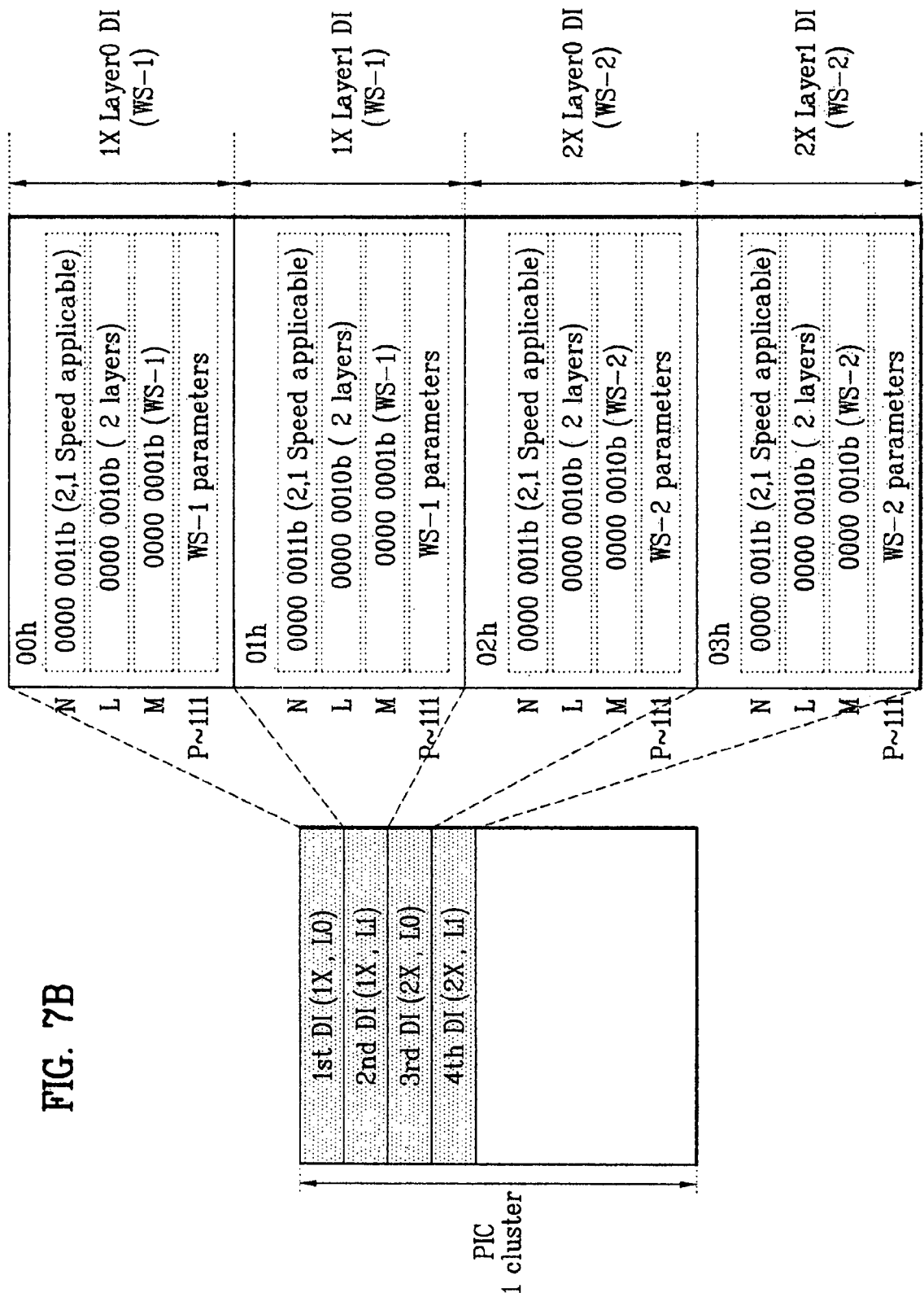
Figure 7C:
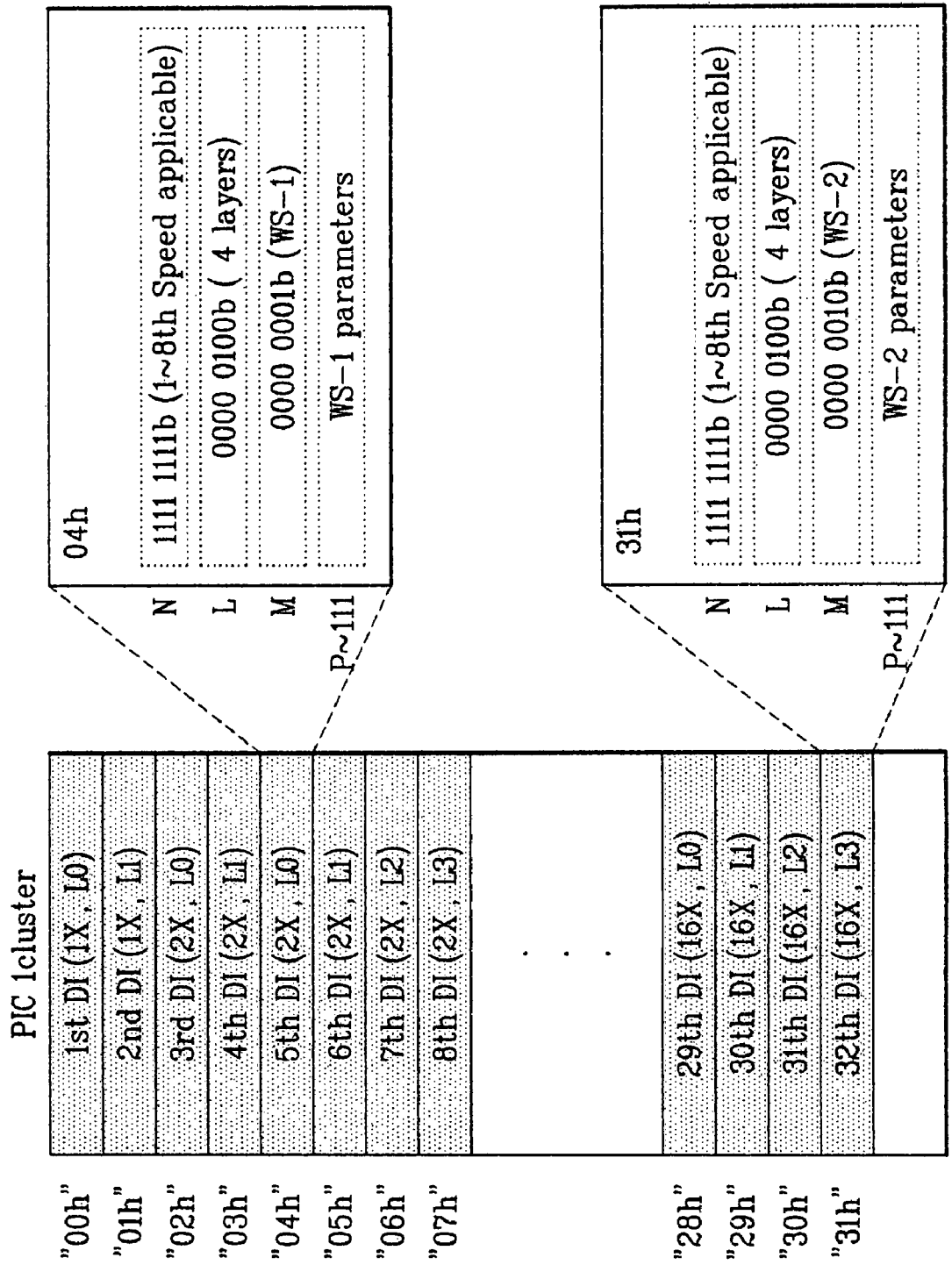

FIGS. 7A to 7C are diagrams of an another example of recording disc information according to the first embodiment of the present invention, in which 'disc-applicable writing speed information' and 'recording layer information existing within disc' are commonly recorded within the corresponding disc.

Referring to FIG. 7A, 'DI frame sequence number in DI block' is provided to $5^{th}$ byte of each disc information to mean a sequence, which means that disc informations are configured in a specific sequence in the same manner of FIG. 4. Besides, writing speed information applicable by a corresponding disc is recorded within a specific area ($N^{th}$ byte) within disc, which is named 'Writing speed flag' field.

For instance, whether a specific writing speed of eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed. For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}×$, $4^{th}×$, $5^{th}×$, $6^{th}×$, $7^{th}×$, $8^{th}×$) to 5×, 6×, 8×, 12×, 14×, and 16× speeds, respectively.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the rest area (4-bits) of the $L^{th}$ byte.

Moreover, identification information for identifying a kind of write strategy (WS) recorded in $P^{th}$~$111^{th}$ bytes is written in another specific area ($M^{th}$ byte) within the disc information, which is named 'Write Strategy (WS) Type' field.

Namely, in the disc information of the present invention, one write strategy (WS) is recorded for a specific writing speed and a specific recording layer and the write strategy is optionally selected from various kinds of specified types by a disc manufacturer. Hence, if the corresponding disc information is a first type write strategy WS-1, '0000 0001' is written in the $M^{th}$ byte. If the corresponding disc information is a second type write strategy WS2, '0000 0010' is written in the $M^{th}$ byte. And, substantial write strategy (WS) is recorded in $P^{th}$~$111^{th}$ bytes. Yet, the substantial write strategy (WS) will be recoded as a value interoperating with the decided write strategy (WS) type in the $M^{th}$ byte. The write strategy (WS) type via the $M^{th}$ byte is optionally recordable in every disc information. And, it is also possible to apply one specified write strategy (WS) type in 1× speed disc information, which is expected to be supported by every record playback apparatus (FIG. 10), in a mandatory manner.

The detailed recording method of the write strategy (WS) is not a major concern of the present invention. Yet, in brief, a medium property of a recording layer is generally modified by applying a laser beam to the recording layer within an optical disc via a pickup ('11' in FIG. 10) to perform a recording thereof. Hence, it should be decided a strength (write power) of the laser beam, a time of applying the write power thereto, and the like. The above-decided various kinds of write strategies are named 'Write Strategy (WS)' in general and specific contents recorded within a specific 'Write Strategy (WS)' are named 'Write Strategy (WS) parameters'.

And, the write strategy (WS) can be recorded in various ways. As a disc becomes to be highly densified and to run at higher speed, a writing speed, i.e., disc RPM) as well as the medium property of the recording layer is considerably affected. Hence, a more accurate system is requested. And, the various write strategies (WS) are explained as follows for example.

First of all, there is a system having a recording pulse smaller by 1 than a recording mark size (n) formed on a recording layer medium, which may be called '(n−1) WS'. Secondly, there is a system having a recording pulse having a size amounting to a half of the recording mark size (n), which may be called 'n/2 WS'. Besides, new write strategies (WS) keep being developed. Regarding the different kinds of write strategy (WS), when there exist the various systems of the write strategy (WS) exist as parameters applied to the write strategies (WS) differ from each other, a disc manufacturer tests the recording power according to the write strategy (WS) recorded in the selected $M^{th}$ byte and then records a result of the test as write strategy (WS) in the Pth~$111^{th}$ bytes within the disc information.

From the above-recorded 'writing speed information' in the $N^{th}$ byte and the 'recording layer information' in the $L^{th}$ byte, the record playback apparatus (FIG. 10) recognizes how many disc informations exist within the corresponding disc. Namely, the number of the existing disc informations is found by multiplying an applicable writing speed number by the number of recording layers.

As the present invention applies one write strategy (WS) for a specific writing speed and a specific recording layer, the kind (type) and number of the write strategy (WS) may not be taken into consideration in deciding the number of disc information(s). Yet, in a second embodiment of the present invention, it will be described that a plurality of write strategies (WS) can exist for a specific writing speed and a specific recording layer. In such a case, the total number of the existing disc informations is not always found by multiplying an applicable writing speed number by the number of recording layers.

Hence, a sequence of a plurality of the above-decided disc informations is decided by the sequence numbers, which is written in the $5^{th}$ byte in the foregoing description, and each of the disc informations designates the previously decided writing speed and recording layer by the sequence.

For example, by knowing that four writing speeds applicable by a disc exist if the $N^{th}$ byte is '0000 1111' and that two recording layers exist within the disc if the $L^{th}$ byte is '0000 0010', total eight disc informations are needed so that the sequence will be '00h~07h'. And, it is previously decided that disc informations of '00h', '01h', '02h', '03h', '04h', '05h', '06h', and '07h' relate to '1' speed, $1^{st}$ recording layer', '2× speed, $2^{nd}$ recording layer', '2× speed, $1^{st}$ recording layer', '2× speed, $2^{nd}$ recording layer', '$3^{rd}$ writing speed, $1^{st}$ recording layer', '$3^{rd}$ writing speed, $2^{nd}$ recording layer', '$4^{th}$ writing speed, $2^{nd}$ recording layer', and '$4^{th}$ writing speed, $2^{nd}$ recording layer', respectively.

Hence, in order to acquire the disc information for a specific target writing speed and a specific target recording layer, the record playback apparatus (FIG. 10) is facilitated to check which disc information is related to the specific target writing speed and recording layer from 'writing speed information' of the $N^{th}$ byte and 'recording layer information' of the $L^{th}$ byte commonly recorded within the respective disc informations instead of playing back to check the entire disc informations.

FIG. 7B shows an example of recording disc information according to the first embodiment of the present invention in FIG. 7A. It can be known that there are two (1×, 2×) applicable writing speeds from $N^{th}$ byte ('0000 0010b') commonly recorded in the entire disc informations and that two recording layers exist within a disc from $L^{th}$ byte ('0000 0010b').

Hence, in the example of FIG. 7B, total four disc informations (two recording layers * two writing speeds) exist and a sequence of the disc informations becomes '00h' (1×,L0)→ '01h' (1×,L1)→'02h' (2×, L0)→'03h' (2×, L1). This is done by a specified content according to a predetermined sequence. Thus, the entire disc informations should be configured according to the above manner to enable reciprocal compatibility for utilization.

An intrinsic write strategy (WS) is recorded in other bytes within each disc information as well as $N^{th}$ and $L^{th}$ bytes. Specifically, information of a type of a write strategy (WS) written in $P^{th}$~$111^{th}$ bytes within the corresponding disc information is recorded in $M^{th}$ byte. Namely, informations in the $M^{th}$ and $p^{th}111^{th}$ bytes can differ in each disc information.

In the example in FIG. 7B, '00h' (1×,L0) and '01h' (1X,L1) relate to the application of a first type write strategy (WS–1) and '02h' (2×,L0) and '03h' (2×,L1) relate to the application of a second type write strategy (WS–2).

FIG. 7C shows another example of recording disc information according to the first embodiment of the present invention in FIG. 7A. It can be known that there are eight (1×, 2×, ..., 16×) applicable writing speeds from $N^{th}$ byte ('1111 1111b') commonly recorded in the entire disc informations and that four recording layers exist within a disc from $L^{th}$ byte ('0000 010b').

Hence, in the another example of FIG. 7C, total thirty-two disc informations (four recording layers * eight writing speeds) exist and a sequence of the disc informations becomes '00h' (1×,L0)→'01h' (1×,L1)→'02h' (1×,L2)→ '03h' (1×,L4)→'04h' (2×,L0)→ ... →'31h' (16×,L4). This is done by a specified content according to a predetermined sequence. Thus, the entire disc informations should be configured according to the above manner to enable reciprocal compatibility for utilization.

An intrinsic write strategy (WS) is recorded in other bytes within each disc information as well as $N^{th}$ and $L^{th}$ bytes. Specifically, information of a type of a write strategy (WS) written in $P^{th}$~$111^{th}$ bytes within the corresponding disc information is recorded in $M^{th}$ byte. Namely, informations in the $M^{th}$ and $P^{th}$~$111^{th}$ bytes can differ in each disc information.

In the another example of FIG. 7C, if a record playback unit (FIG. 10) intends to search disc information related to 2× speed (2×,L0) of a first recording layer to perform recording by applying a write strategy (WS) within the corresponding disc information, it can be known from the informations in the $N^{th}$ and $L^{th}$ bytes commonly recorded in the entire disc informations that total thirty-two disc informations (four recording layers * eight writing speeds) exist in the corresponding disc according to the sequence of the disc informations such as '00h' (1×,L0)→'01h' (1×,L1)→'02h' (1×,L2)→'03h' (1×, L4)→'04h' (2×,L0)→ ... →'31h' (16×,L4). Hence, the record playback apparatus (FIG. 10) enables to recognize that the disc information related to the 2' speed (2×,L0) of the first recording layer to be searched is '04h' and that the corresponding disc information ('04h') is recorded as the first type write strategy (WS–1) from the write strategy (WS) type identification information ('0000 0001b') recorded in the $M^{th}$ byte within the corresponding information ('04h'), thereby reading out parameter values of the first type write strategy (WS–1) via the $P^{th}$~$111^{th}$ bytes to utilize in the recording.

Likewise, if intending to search disc information related to 16× speed (16×,L3) of a fourth recording layer to perform recording by applying a write strategy (WS) within the corresponding disc information, the record playback unit (FIG. 10) recognizes that the corresponding disc information is '31h' via the same process and that the write strategy type (WS) is the second type (WS–2), thereby enabling to utilize them in the recording.

Figure 8:
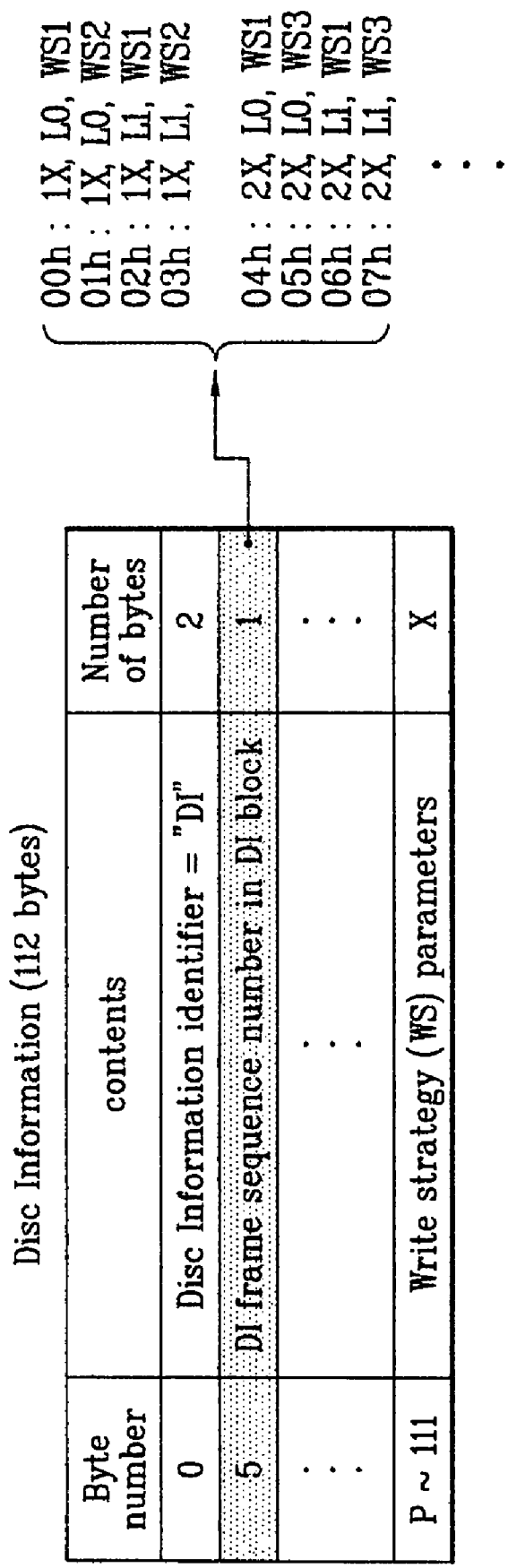
FIG. 8 is a diagram of a sample data structure of disc control information recorded according to a second embodiment of the present invention.
Figure 9A:
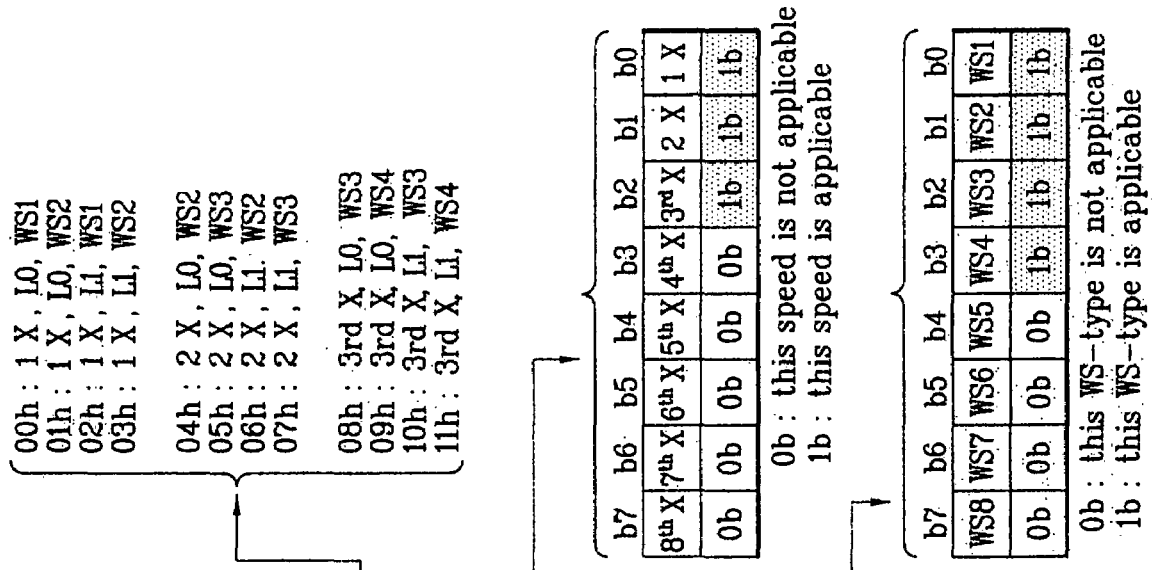
FIGS. 9A and 9B are exemplary diagrams of a configuration sequence of the disc control information recorded according to the second embodiment of present invention.
Figure 9B:
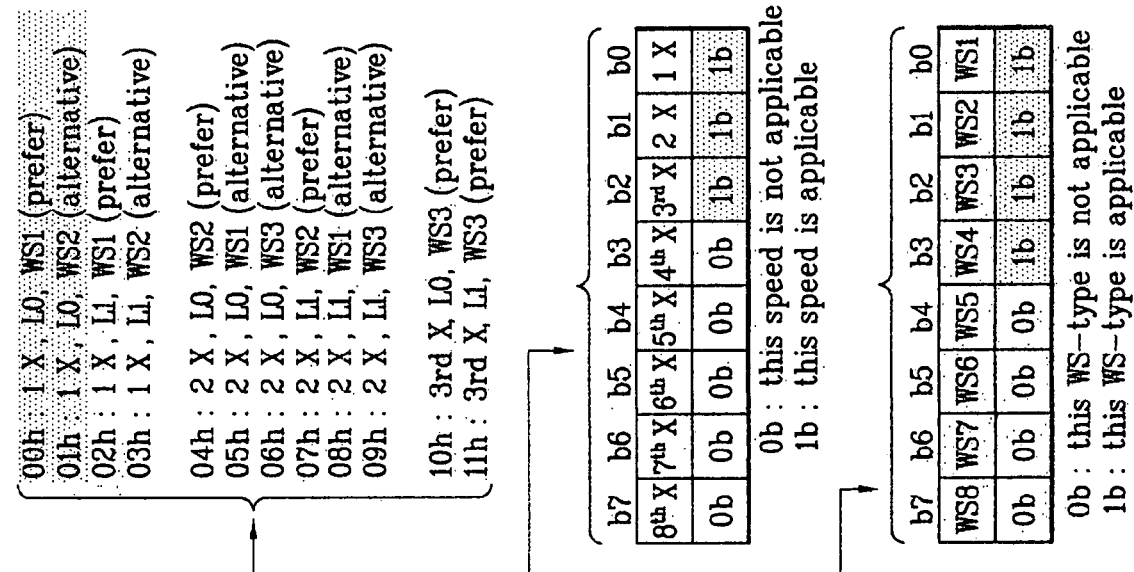

FIGS. 8 to 9B shows a method of recording dist information of an optical disc according to a second embodiment of the present invention, which is extended from the first embodiment of the present invention in FIG. 4. The second embodiment of the present invention is characterized in that disc information is configured per writing speed, disc information is configured per recording layer within the corresponding writing speed, and at least one write strategy (WS) is configured for each disc information per corresponding recording layer.

FIG. 8 shows a concept of the method of recording disc information of the optical disc according to the second embodiment of the present invention.

Referring to FIG. 8, a sequence for disc information each is decided by a sequence number and is recorded by 1-byte.

For instance, the information is recorded in a $5^{th}$ byte within disc information, is named 'DI' frame sequence number in 'DI block', and is briefly represented by '00h, 01h, 02h, ...'. Namely, if the information of the $5^{th}$ byte is '00h', it means $1^{st}$ disc information. If the information of the $5^{th}$ byte is '07h', it means $8^{th}$ disc information.

In configuring disc information, the present invention is characterized in that disc information is separately provided per writing speed and per recording layer and that a configuration sequence of a plurality of the separately provided disc informations is uniformly decided according to a predetermined manner.

For instance, if a corresponding optical disc includes a pair of recoding layers and plural kinds of applicable writing speeds exist, disc information can be configured in a following manner.

'00h' of $1^{st}$ disc information is related to 1× speed, $1^{st}$ recording layer L0, and WS1. '01h' of $2^{nd}$ disc information is related to 1× speed, $1^{st}$ recording layer L0, and WS2. '02h' of $3^{rd}$ disc information is related to 1× speed, $2^{nd}$ recording layer L1, and WS 1. '03h' of $4^{th}$ disc information is related to 1× speed, $2^{nd}$ recording layer L1, and WS2. '04h' of $5^{th}$ disc information is related to 2× speed, $1^{st}$ recording layer L0, and WS1. '05h' of $6^{th}$ disc information is related to 2× speed and $1^{st}$ recording layer L0, and WS3. '06h' of $7^{th}$ disc information is related to 2× speed, $2^{nd}$ recording layer L1, and WS1. And, '07h' of $8^{th}$ disc information is related to 2× speed, $2^{nd}$ recording layer L1, and WS3.

Namely, in configuring disc information, the second embodiment according to the s present invention is characterized in that at least one disc information is configured per writing speed, the respective per writing speed disc informations are reconfigured per recording layer, and at least one WS type is provided to each recording layer.

Hence, the writing speed, the recording layer, and the WS type are taken into consideration in order of priority in configuring the disc informations.

FIG. 9A exemplarily shows a method of configuring disc information according the second embodiment of the present invention in FIG. 8, in which total sixteen disc informations are configured in case that four kinds of applicable writing speeds (e.g., 1×, 2×, 4×, and 6×) and four recording layers (L0, L1, L2, and L3) exist within a disc.

Referring to FIG. 9A, 'DI frame sequence number in DI block' is provided to $5^{th}$ byte of each disc information to mean a sequence, which means that disc informations are configured in a specific order (writing speed →recording layer → WS type) of priority in FIG. 8. Besides, writing speed information applicable by a corresponding disc is recorded within a specific area ($N^{th}$ byte) within disc, which is named 'Writing speed flag' field. For instance, whether a specific writing speed of eight kinds of writing speeds is applicable by the corresponding disc is represented by 1-bit each in the same area having 1-byte allocated thereto.

Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating presence or non-presence of applicability of a specific writing speed. For instance, if 1× speed is applicable by a corresponding disc only, '0000 0001' is written in $N^{th}$ byte. If all of the eight kinds of writing speeds are applicable, '1111 1111' is written in the $N^{th}$ byte. In the drawing, '0000 0111b' is written in the $N^{th}$ byte to allow $1^{st}$ to $3^{rd}$ writing speeds.

In the above explanation, 1× and 2× speeds utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}$ X, $4^{th}$ X, $5^{th}$ X, $6^{th}$ X, $7^{th}$ X, $8^{th}$ X) to 4×, 6×, 8×, 12×, 14×, and 16× speeds, respectively.

And, information of informing a kind of write strategy (WS) applicable by a specification of a corresponding disc is recorded in another specific area ($L^{th}$ byte) within the disc information, which is named 'Write Strategy (WS) flag' field. For instance, whether a specific write strategy (WS) of eight kinds of write strategies (WS) is applicable by the corresponding disc is represented by 1-bit each in the same area having 1-byte allocated thereto. Namely, it can be defined that the corresponding write strategy (WS) is not applicable (supported) if a bit value is '0b' in entire bits or that the corresponding write strategy (WS) is applicable (supported) if the bit value is '1b'. Hence, each of the bits b0~b7 within 1-byte becomes flag information indicating applicability of a specific write strategy (WS). For instance, if $1^{st}$ to $3^{rd}$ type write strategies WS1 to WS3 are applicable by a corresponding disc only, '0000 0111b' is written in $L^{th}$ byte. If all of the eight types of write strategies (WS 1 to WS8) are applicable, '1111 1111b' is written in the $L^{th}$ byte. In the drawing, '0000 1111b' is written in the $L^{th}$ byte to indicate that four WS types WS1 to WS4 are applicable.

Moreover, recording layer information indicating the number of recording layer(s) existing within the corresponding disc is recorded in another specific area ($M^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer (one recoding layer) in FIG. 1, '0000 0001b' is written in the $M^{th}$ byte. In case that the recording layer is the dual layer (two recording layers) in FIG. 2, '0000 0010b' is written in the $M^{th}$ byte. In case that four recording layers exist, '0000 0100b' is written in the $M^{th}$ byte.

Besides, parameters of a selected write strategy (WS) are written in another specific area ($P^{th}$~$111^{th}$ bytes) within the disc information, which is named 'Write Strategy (WS) parameters' field.

By writing the $N^{th}$, $L^{th}$, and $M^{th}$ byte informations recorded within the disc information by the same values in common to the entire disc informations, respectively, the record playback apparatus (FIG. 10) is facilitated to acquire the informations of the writing speed applicable by the corresponding disc, the write strategy (WS) kind, and the number of the recording layers despite playing back any disc information.

Specifically, it may be able to record disc information per writing speed, per recording layer, and per write strategy (WS) type. Yet, in such a case, the number of the recorded disc informations excessively increases. Moreover, a disc manufacturer should test the entire write strategy (WS) types and record the test results within the disc information, whereby it becomes a burden.

Therefore, in the embodiment according to the present invention, write strategies (WS) of which number (m) is smaller than that (n) of the maximum applicable write strategy types are recordable within disc information and a disc manufacturer further enables to optionally record a specific one of a plurality of write strategies (WS), whereby disc manufacturer's convenience is secured as well as an efficient recording of disc information is enabled.

In FIG. 9A, recording is performed at 1× speed (1×) using $1^{st}$ and $2^{nd}$ type write strategies WS1 and WS2, at 2× speed (2×) using $2^{nd}$ and $3^{rd}$ type write strategies WS2 and WS3, or at $3^{rd}$ writing speed (3×) using $3^{rd}$ and $4^{th}$ type write strategies WS3 and WS4.

Namely, it is able to record disc information using write strategy (WS) types (two types) less than total applicable write strategy (WS) types (four types) per writing speed.

FIG. 9B shows another example of recording disc information according to the second embodiment of the present invention in FIG. 8. Like FIG. 9A, three kinds of applicable writing speeds exist and '00000111b' is written in $N^{th}$ byte. Four applicable write strategy types exist and '00001111b' is written in $L^{th}$ byte. And, two recording layers exist within a disc and '00000010b' is written in $M^{th}$ byte.

Specifically, in configuring disc information using one of a plurality of applicable write strategies (WS), at least one disc information is configured per the same writing speed and recording layer. In doing so, the most preferentially provided disc information is defined as preferred WS provided by a disc manufacturer and another disc information following the preferred WS is defined as alternative WS.

Namely, both disc information '00h' and disc information '01h' relate to 1× speed (1×) and $1^{st}$ recording layer (L0). Yet, the WS1 type information recorded in '00h' as preferentially provided disc information becomes the preferred WS and the WS1 type information recorded in '01h' as a next provided one becomes the alternative WS.

And, disc information '04h', disc information '05h', and disc information '06h' relate to 2× speed (2×) and $1^{st}$ recording layer (L0). Yet, the WS2 type information recorded in '04h' as preferentially provided disc information becomes the preferred WS, and the WS1 type information recorded in '05h' and the WS3 type information recorded in '06h' as next provided ones become the alternative WSs, respectively. Namely, they can be applied to at least three disc informations of the same writing speed/recording layer.

Moreover, disc information '10h' relates to $3^{rd}$ speed ($3^{rd}$ X) and $1^{st}$ recording layer (L0) and disc information '11h' relates to $3^{rd}$ speed ($3^{rd}$ X) and $2^{nd}$ recording layer (L0). In case that only one WS type information is provided to the same writing speed/recording layer, the provided WS becomes the preferred WS.

Namely, when a disc manufacturer provides disc information within a disc according to the previously determined specification, an optical record playback apparatus (FIG. 10) reads out the disc information in a specific order (writing speed→recording layer). If a plurality of disc informations exist on the same writing speed/recording layer, the optical record playback apparatus (FIG. 10) recognizes the preferentially provided WS within the disc information as the preferred WS and the next WS as the alternative WS additionally provided by a disc manufacturer, thereby enabling record playback using disc information efficiently.

Figure 10:
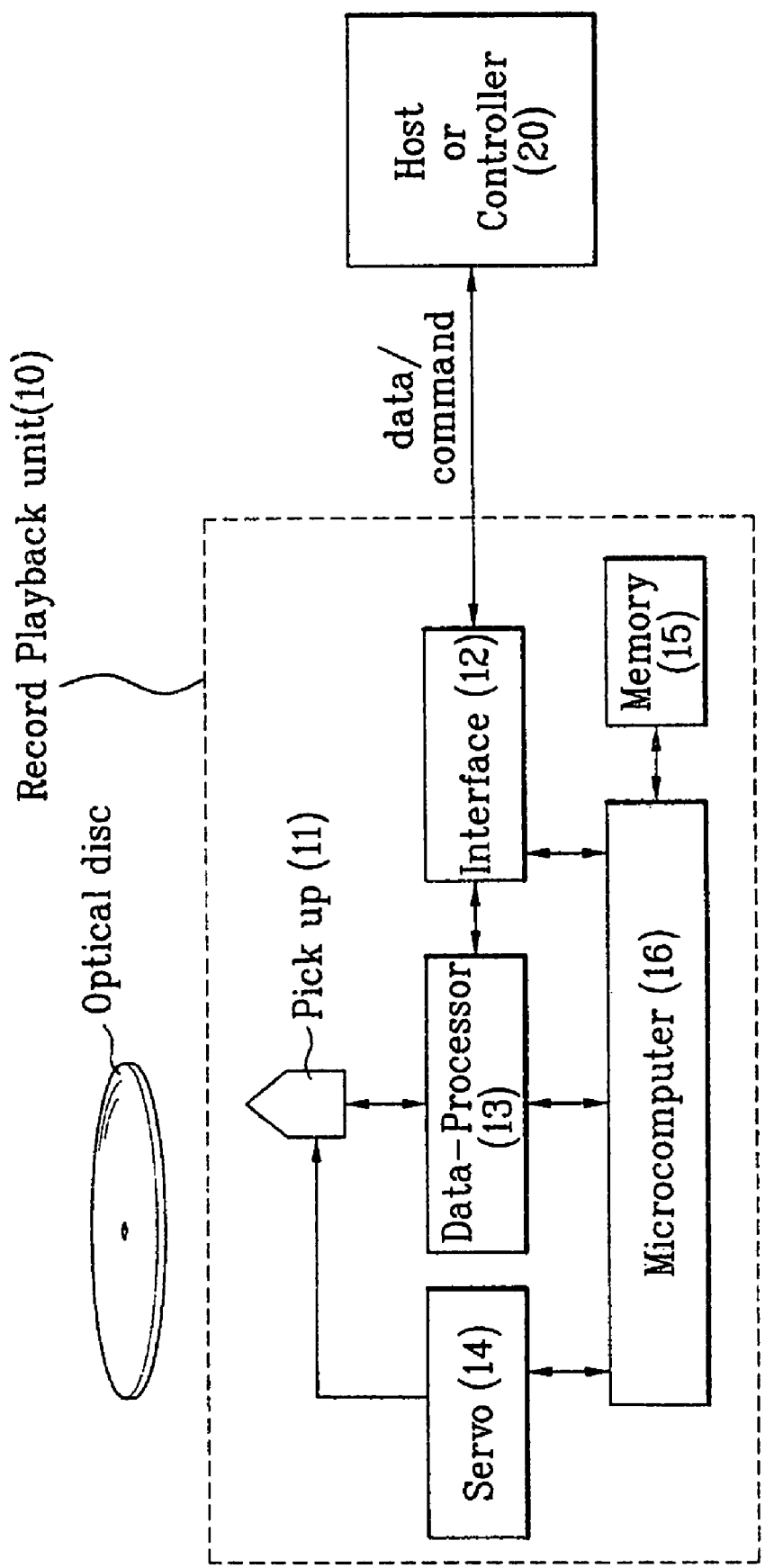
FIG. 10 is a block diagram of an optical disc recording and reproducing apparatus according to the present invention.

FIG. 10 is a block diagram of an optical disc record playback according to the present invention.

Referring to FIG. 10, a record playback apparatus according to the present invention includes a record playback unit 10 carrying out record playback on an optical disc and a control unit 20 controlling the record playback unit 10.

The control unit 20 gives a record or playback command for a specific area, and the record playback unit 10 caries out the record/playback for the specific area according to the command of the control unit 20. Specifically, the record playback unit 10 includes an interface unit 12 performing communications with an external device, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc control information, and a microcomputer 16 responsible for controlling the above-described elements within the record playback unit 10.

A recording process of an optical disc according to the present invention is explained in detail as follows.

First of all, once an optical disc is loaded in the optical record playback apparatus, the entire disc management information within the disc is read out to be temporarily stored in the memory 15 of the record playback unit 10. And, various kinds of the disc management information are utilized for the record/playback of the optical disc. Specifically, the management information stored in the memory 15 includes disc control information of the present invention. Hence, the recording layer information, writing speed information, and write strategy fitting the corresponding writing speed recorded within the disc information are read out to be stored in the memory.

If intending to perform a recording on a specific area within the optical disc, the control unit 20 renders such an intent into a writing command and then delivers it to the record playback unit 10 together with data for writing location information to be recorded. After receiving the writing command, the microcomputer 16 decides the corresponding writing speed applied to an intended recording layer within the optical disc from the management informations stored in the memory 15 and then performs the writing command using the optimal write strategy by referring to the decided writing speed.

Specifically, in case that the recording is performed on the optical disc by the present invention, the disc information as management information is provided in a specific order and the microcomputer 16 recognizes which WS is the preferred WS of the disc manufacturer in the same writing speed/recording layer. Therefore, it is more facilitated to perform the recording on a specific recoding layer within an optical disc at a specific writing speed.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A computer-readable medium comprising:
a specific area of the computer-readable medium storing control information for controlling recording of data on each of the more than one recording layer of the computer-readable medium, the control information including information units in sequential order, each information unit including write strategy information usable at a writing speed applicable to a recording layer of the computer-readable medium, the sequential order of at least one information units being by order of increasing writing speed among the information units, and for a same writing speed, the sequential order of the at least one information unit being by order of ascending recording layer number among the information units.

2. The computer-readable medium of claim 1, wherein the write strategy information includes write strategy parameters corresponding to recording power value and pulse timing value usable at the writing speed applicable to the recording layer during recording of the data.

3. The computer-readable medium of claim 2, wherein the specific area is located in a specific recording layer of the computer-readable medium.

4. The computer-readable medium of claim 3, wherein the specific area is a sub-area of a lead-in area included in the specific recording layer.

5. The computer-readable medium of claim 4, wherein the control information is pre-recorded or embossed information in the sub-area of the lead-in area.

6. The computer-readable medium of claim 5, wherein the pre-recorded or embossed control information is copied to a recordable area of the computer-readable medium.

7. The computer-readable medium of claim 6, wherein the computer-readable medium is a recordable DVD disc including at least two recording layers.

8. The computer-readable medium of claim 5, wherein the write strategy information further includes write strategy type information indicating one of n−1 write strategy type and n/2 write strategy type where n is a length of mark and each type represents a number of write pulses to form a corresponding mark.

9. The computer-readable medium of claim 8, wherein the n−1 write strategy type includes a different write parameters than that of the n/2 write strategy type.

10. The computer-readable medium of claim 9, wherein the computer-readable medium is a recordable Blu-ray Disc including at least two recording layers.

11. An apparatus for recording data on a recording medium including at least two recording layers, comprising:
    an optical pickup configured to read control information including information units from a specific area of one of the recording layers of the recording medium and configured to record the control information on a recordable area of the recording medium, each information unit including write strategy information usable at a writing speed applicable to one of the recording layers; and
    a controller, operatively coupled to the optical pickup, configured to control the optical pickup to record the information units in sequential order, the sequential order of at least one information units by order of increasing writing speed among the information units, and for a same writing speed, the sequential order of the at least one information units being by order of ascending recording layer number among the information units.

12. The apparatus of claim 11, wherein
    the control information is pre-recorded or embossed information and is located in a sub-area of a lead-in area of the recording medium;
    and the optical pickup is configured to read the pre-recorded or embossed control information.

13. The apparatus of claim 12, wherein the write strategy information includes write strategy parameters corresponding to recording power value and pulse timing value usable at the writing speed applicable to the recording layer and the optical pickup is configured to read the control information including the write strategy parameters.

14. An apparatus for recording data on a recording medium including at least two recording layers, comprising:
    an optical pickup configured to read or write data from or on the recording medium;
    a servo, operatively coupled to the optical pickup, configured to control a servo operation of the optical pickup according to a writing speed;
    a memory configured to store control information, the control information including write strategy information usable at a writing speed applicable to one of the recording layers; and
    a controller operatively coupled to the optical pickup, servo and memory, the controller configured to identify the control information stored in the memory and control the optical pickup to record the data on the recording medium by using the write strategy information included in the identified control information, the control information including a plurality of information units in a sequential order, each information unit including the write strategy information, and the sequential order of at least one information unite being by order of increasing writing speed, and for a same writing speed among the information units, the sequential order of the at least one information units being by order of ascending recording layer number among the information units.

15. The apparatus of claim 14, wherein the memory stores the control information read by the optical pickup.

16. The apparatus of claim 14, wherein
    the write strategy information includes write strategy parameters corresponding to recording power value and pulse timing value usable at the writing speed applicable to the recording layer; and the controller is configured to control the optical pickup to record the data by using the write strategy parameters included in the write strategy information.

17. The apparatus of claim 16, wherein
    the controller is further configured to check a write strategy type based on write strategy type information indicating one of n−1 write strategy type and n/2 write strategy type where n is a length of mark and each type represents a number of write pulses to form a corresponding mark, the n−1 write strategy type including different write parameters than that of the n/2 write strategy type; and
    the controller configured to read write strategy parameters corresponding to the write strategy type and control the recording of data by using the write strategy parameters.

18. A method for recording data on a recording medium including at least two recording layers, the method comprising:
    reading control information including information units from a specific area of one of the recording layers of the recording medium, each information unit including writing strategy information usable at a writing speed applicable to one of the recording layers; and
    recording the read at least one information units in sequential order on a recordable area of the recording medium, the sequential order of the at least one information units being by order of increasing writing speed, and for a same writing speed among the information units, the sequential order of the at least one information units being by order of ascending recording layer number among the information units.

19. The method of claim 18, wherein the reading step reads the control information from a sub-area of a lead-in area of the recording medium, the control information being pre-recorded or embossed information in the sub-area.

20. The method of claim 19, wherein the write strategy information includes write strategy parameters corresponding to recording power value and pulse timing value usable at the writing speed applicable to the recording layer during recording of the data.

21. A method for recording data on a recording medium including at least two recording layers, the method comprising:
- reading control information including information units in sequential order from a specific area of one of the recording layers of the recording medium, each information unit including write strategy information usable at a writing speed applicable to one of the recording layers, the sequential order of at least one information units being by order of increasing writing speed among the information units, and for a same writing speed, the sequential order of the at least one information units being by order of ascending recording layer number among the information units; and
- recording the data on the recording medium by using the write strategy information included in the control information.

22. The method of claim 21, wherein the reading step reads the control information from a sub-area of a lead-in area of the recording medium.

23. The method of claim 22, further comprising:
- reading write strategy type information which is included in the control information and indicates one of n−1 write strategy type and n/2 write strategy type where n is a length of mark and each type represents a number of write pulses to form a corresponding mark, the n−1 write strategy type including a different write parameters than that of the n/2 write strategy type.

24. The method of claim 22, wherein the recording step records the data on a user data area of the recording medium by using write strategy parameters included in the write strategy information, the write strategy parameters corresponding to recording power value and pulse timing value usable at the writing speed applicable to the recording layer.

25. The computer-readable medium of claim 1, comprising:
- an L0 recording layer and an L1 recording layer; and wherein
- the sequential order of information units is by order of increasing writing speed, and for a same writing speed, the sequential order of information units is by the L0 recording layer and then by the L1 recording layer.

26. A method for recording data on a recording medium including at least two recording layers, comprising:
- storing control information, the control information including write strategy information usable at a writing speed applicable to one of the recording layers, the control information including a plurality of information units in a sequential order, each information unit including the write strategy information, and the sequential order of at least one information unite being by order of increasing writing speed among the information units, and for a same writing speed, the sequential order of the at least one information unite being by order of ascending recording layer number among the information units; and
- recording data on the recording medium by using the stored control information.

* * * * *